United States Patent Office 3,378,603
Patented Apr. 16, 1968

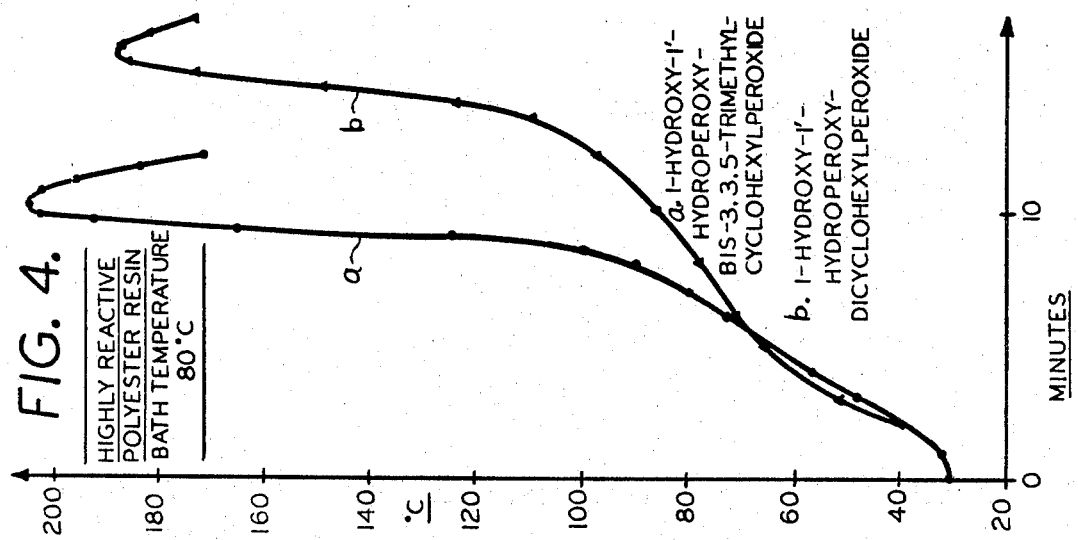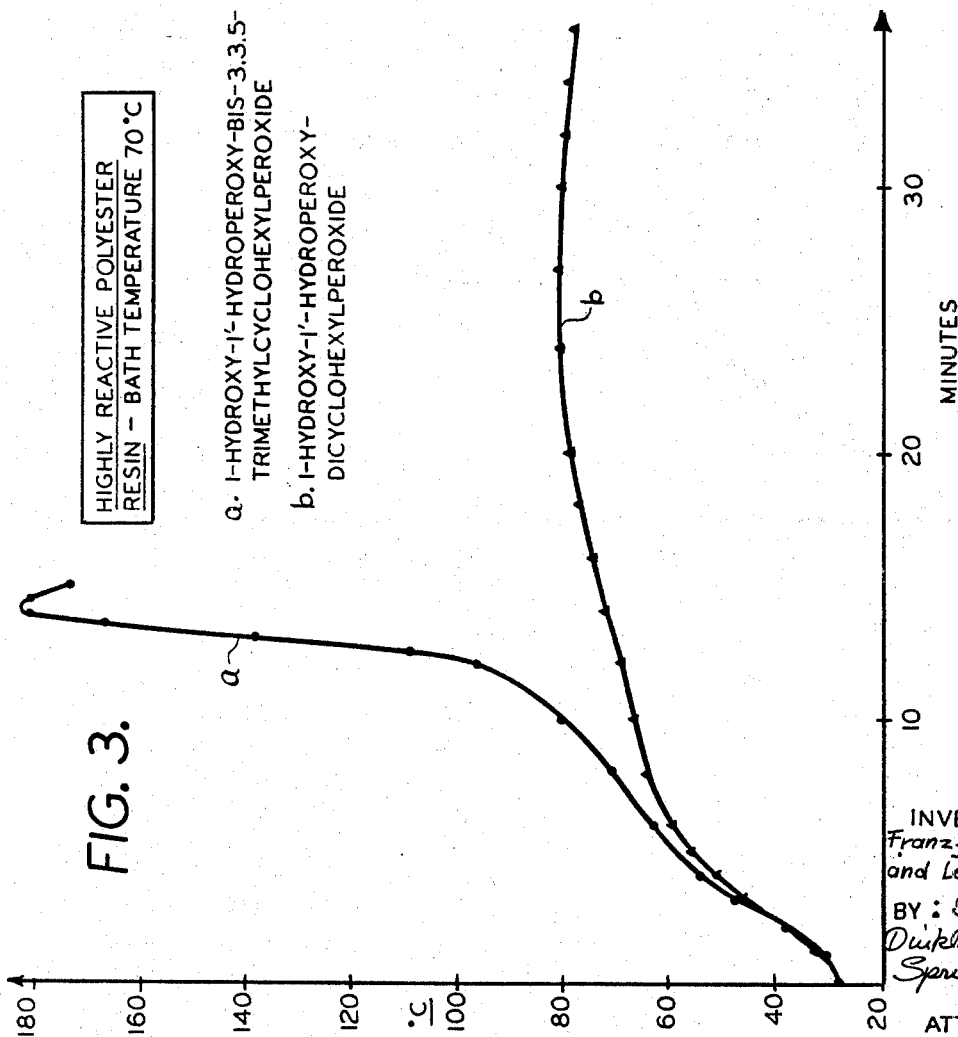

3,378,603
PROCESS FOR THE POLYMERIZATION OF UNSATURATED POLYESTER RESINS
Franz-Josef Meyer, Gladbeck, and Leo Rensmann, Dorsten, Germany, assignors to Scholven-Chemie Aktiengesellschaft, Gelsenkirchen-Buer, Germany, a corporation of Germany
Filed Mar. 9, 1966, Ser. No. 532,925
10 Claims. (Cl. 260—861)

ABSTRACT OF THE DISCLOSURE

The invention herein concerns catalysts for unsaturated polyester/vinyl monomer systems which impart rapid gel times and improved cure rates in the absence of promoters. The catalyst is hydroxy-1'-hydroperoxy-bis (3,3,5-trimethylcyclohexylperoxide).

---

Figure 1:
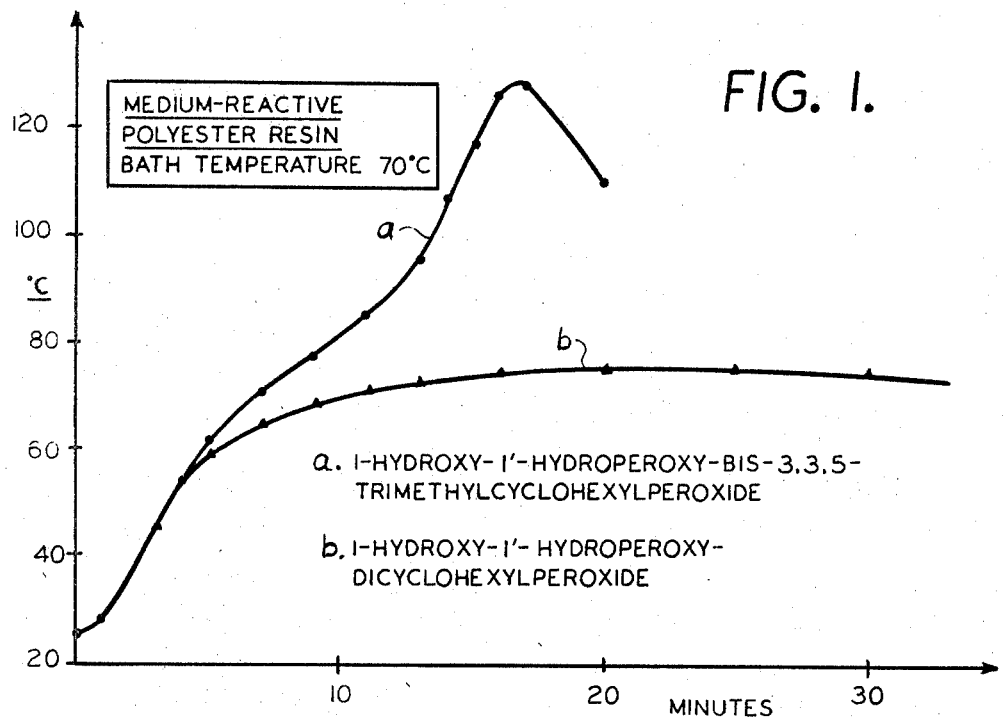

The instant invention refers to a process for the polymerization of unsaturated polyester resins, and more particularly refers to the polymerization of unsaturated polyester resins in the presence of a particularly highly reactive ketone peroxide catalyst as initiator.

Unsaturated polyester resins harden or cross-link through an olefinic polymerization reaction. The polymerization reaction is initiated through the generation of free radicals. In general, organic peroxides have in the past been used as free radical generators which initiate the referred to olefinic polymerization reaction.

The unsaturated polyester resins which may be polymerized according to the process of the invention are, for example, polyesters of bivalent saturated alcohols and ethylene-$\alpha,\beta$-dicarboxylic acids. The cross-linking agent is generally a copolymerizable vinyl compound. The unsaturated polyester resin used in this invention is preferably one which is the condensation product of an $\alpha,\beta$-ethylenically unsaturated dicarboxylic acid and a bivalent alcohol. Exemplary of the carboxylic acids useful to prepare unsaturated polyesters to prepare in accord with this invention are maleic, fumaric, citraconic or itaconic acid, and exemplary of bivalent alcohols are ethylene glycol, diethylene glycol, triethylene glycol, 1,2- or 1,3-propane diol. However, a part of the unsaturated dicarboxylic acids may also be substituted by saturated dicarboxylic acids, such as phthalic acid, isophthalic acid, adipic acid, succinic acid or sebacic aid. Instead of saturated bivalent alcohols, there may also be used unsaturated diols, such as butene diol. As copolymerizable vinyl compounds, there may be used styrene, divinyl benzene, vinyl acetate, acrylic and methacrylic acid esters, triallylcyanurate, phthalic acid diallyl ester, and the like.

Known organic peroxides, which are used for the hardening of unsaturated polyester resins, are, for example, lauryl peroxide, dibenzoyl peroxide, methylisobutyl ketone peroxide, methylethyl ketone peroxide, cyclohexanone peroxide, cumenehydroperoxide, paramenthane hydroperoxide, di-tertiary butyl peroxide, dicumylperoxide, and the like.

In many cases, it is necessary to obtain, at relatively low temperatures, a quick depth hardening of the unsaturated polyester resins. In these cases, there are used polymerization initiators, preferably peroxides of high activity, such as, for example, methyl ethyl ketone peroxide and cyclohexanone peroxide. This initiation of the polymerization reaction with these peroxides may be accelerated through metal soaps. Such metal soaps, which in general are defined as accelerators, are, for example, cobaltoctoate, cobaltnaphthenate, manganese octoate, manganese naphthenate and specific vanadium compounds. However, the use of metal soaps as accelerators leads, according to the quantity employed, more or less to the discoloration of the hardened unsaturated polyester resin.

It is an object of the instant invention to provide a novel polymerization initiator for the cross-linking and hardening of unsaturated polyester resins.

It is another object of this invention to provide a process for rapidly cross-linking and hardening unsaturated polyester resins.

Other and additional objects of this invention will be apparent from a consideration of this entire specification including the claims appended hereto.

In accord with and fulfilling these objects, one aspect of this invention resides in the use of 1-hydroxyl-1'-hydroperoxy-bis - (3,3,5 - trimethylcyclohexylperoxide), (in short: trimethylcyclohexanoneperoxide), as an initiator for the cross-linking and hardening of unsaturated polyester resins. It has surprisingly been found that the polymerization reaction of unsaturated polyester resins proceeds much more quickly under otherwise similar conditions if it is initiated through 1-hydroxy-1'-hydroperoxy-bis- (3,3,5-trimethylcyclohexylperoxide), such as for example in the use of 1-hydroxy-1'-hydroperoxy-dicyclohexylperoxide as polymerization initiator.

1 - hydroxy - 1' - hydroperoxy - bis - (3,3,5 - trimethylcyclohexylperoxide) may be used in solution, as well as in paste form in softeners. The quantities employed may amount up to 5 percent of pure peroxide of the weight of the unsaturated polyester resin.

The activity of an organic peroxide as polymerization initiator for unsaturated polyester resins may be determined based on the method of the Society of Plastic Industry, 6th Technical Conference (1951), Section 1, through drawing of polymerization curves. The rapidity with which hardening occurs on cross-linking an unsaturated polyester resin, according to this invention, may be determined in the usual known way.

The following examples illustrate the instant invention without limiting the scope thereof.

EXAMPLE I

A mixture of 100 grams of the reaction product of maleic anhydride and phthalic anhydride with propylene glycol in styrene and 2 grams of a 50-percent solution of 1 - hydroxy - 1' - hydroperoxy - bis - (3,3,5 - trimethylcyclohexylperoxide) in triethyl phosphate was prepared at a temperature of 20° C. 20 g. of this mixture were filled into a test tube having a diameter of 19 mm., a length of 180 mm. and a wall thickness of 0.9 mm. Into the center of the sample a thermo-element was centrically introduced, which was connected with a high-speed temperature recorder. The test tube was at once placed into an oil bath of 70° C. in such a manner that the resin surface was well below the oil bath surface. The temperature recorder registered the chronological course of the temperature rise in the resin during the exothermic polymerization reaction as measure for the reaction speed. The polymerized resin was colorless and clear. The same test was carried out with the same amount of a 50-percent solution of 1-hydroxy-1'-hydroperoxy-dicyclohexylperoxide in triethyl phosphate.

The course of the polymerization curves is shown in FIG. 1.

EXAMPLE II

Figure 2:
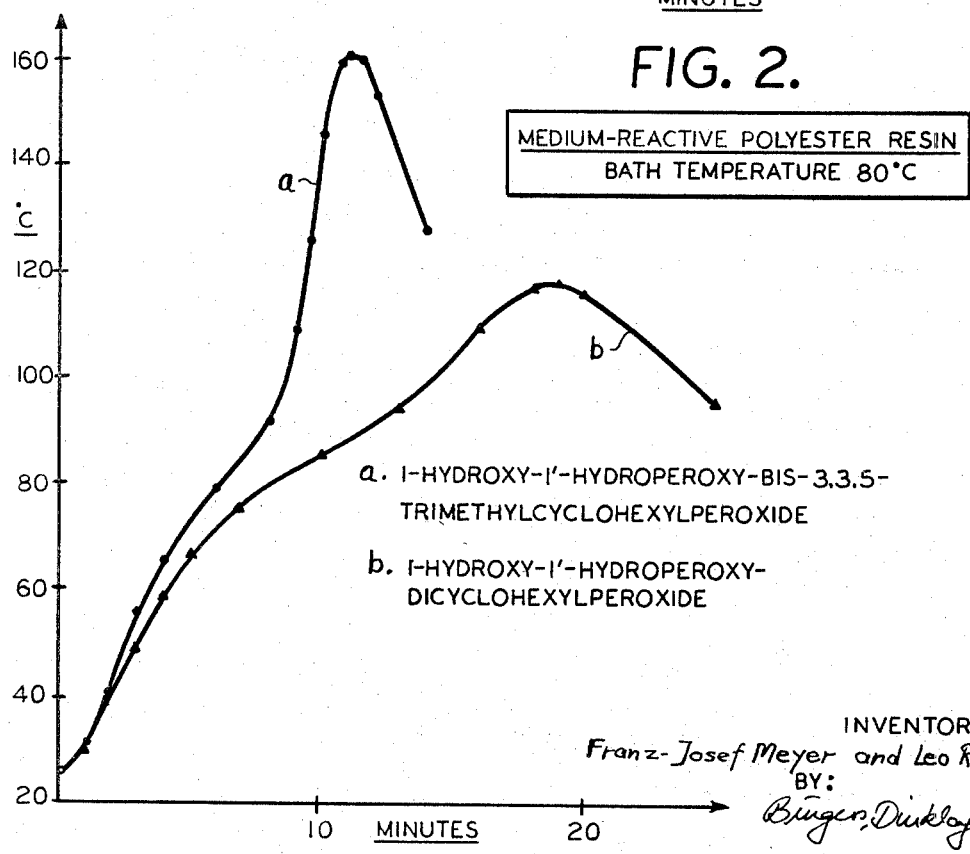

The tests described in Example I were carried out at an oil bath temperature of 80° C. FIG. 2 shows the course of the polymerization curves.

EXAMPLE III

The procedure was the same as in Example I: the resin used was a highly reactive commercially available polyester resin. The oil bath temperature was 70° C. The polymerization curves are shown in FIG. 3.

EXAMPLE IV

According to the method described in Example I, a highly reactive commercially available unsaturated polyester resin was polymerized at an oil bath temperature of 80° C. The polymerization curves are shown in FIG. 4.

Examples I–IV make it possible to recognize the superiority of the use in accordance with the invention of 1-hydroxy-1'-hydroperoxy-bis-(3,3,5-trimethylcyclohexylperoxide) as initiator for the polymerization of unsaturated polyester resins.

What is claimed is:

1. In the process of hardening and cross-linking an unsaturated polyester resin with a vinyl cross-linking agent; the improvement which comprises initiating said polymerization with 1-hydroxy-1'-hydroperoxy-bis-(3,3,5-trimethylcyclohexylperoxide).

2. The improved process as claimed in claim 1, where said peroxide is present in a proportion of about 5 parts to 100 parts of unsaturated polyester resin.

3. The improved process as claimed in claim 2, where said polyester resin contains as its acid residue moitey a member selected from the group consisting of maleic, fumaric, citraconic and itaconic acid.

4. The improved process as claimed in claim 2, where said polyester contains as its alcohol moiety a member selected from the group consisting of ethylene glycol, diethylene glycol, triethylene glycol, 1,2-propane diol and 1,3-propane diol.

5. The improved process claimed in claim 2, where said polyester resin contains as its acid moiety a mixture of a member selected from the group consisting of maleic, fumaric, citraconic and itaconic acid and a non-olefinic unsaturated acid selected from the group consisting of phthalic acid, isophthalic acid, adipic acid, succinic acid and sebacic acid.

6. The improved process as claimed in claim 2, where said alcohol moiety is a mixture of an alcohol selected from the group consisting of ethylene glycol, diethylene glycol, triethylene glycol, 1,2-propane diol and 1,3-propane diol and an ethylenically unsaturated alcohol.

7. The improved process as claimed in claim 2, where said vinyl compound is selected from the group consisting of styrene, divinyl benzene, vinyl acetate, alkyl acrylate, alkyl methacrylate, triallylcyanurate and diallylphthalate.

8. The improved process as claimed in claim 2, where said 1-hydroxy-1'-hydroperoxy-bis-(3,3,5-trimethylcyclohexylperoxide) is introduced into admixture with said polyester resin in fluid form.

9. The improved process as claimed in claim 8, where said fluid is a paste.

10. A composition comprising a mixture of an unsaturated polyester resin with 1-hydroxy-1'-hydroperoxy-bis-(3,3,5-trimethylcyclohexylperoxide).

References Cited

UNITED STATES PATENTS

| | | | |
|---|---|---|---|
| 2,298,405 | 10/1942 | Milas | 260—610 |
| 2,870,200 | 1/1959 | Karasch et al. | 260—610 |
| 3,333,021 | 7/1967 | Geipert | 260—865 |

FOREIGN PATENTS 1,067,589  10/1959  Germany.

MURRAY TILLMAN, *Primary Examiner.*

J. T. GOOLKASIAN, *Assistant Examiner.*